Oct. 15, 1929.  P. SAMARD  1,732,142
DOUGH ROLLER
Filed July 13, 1928  2 Sheets-Sheet 1
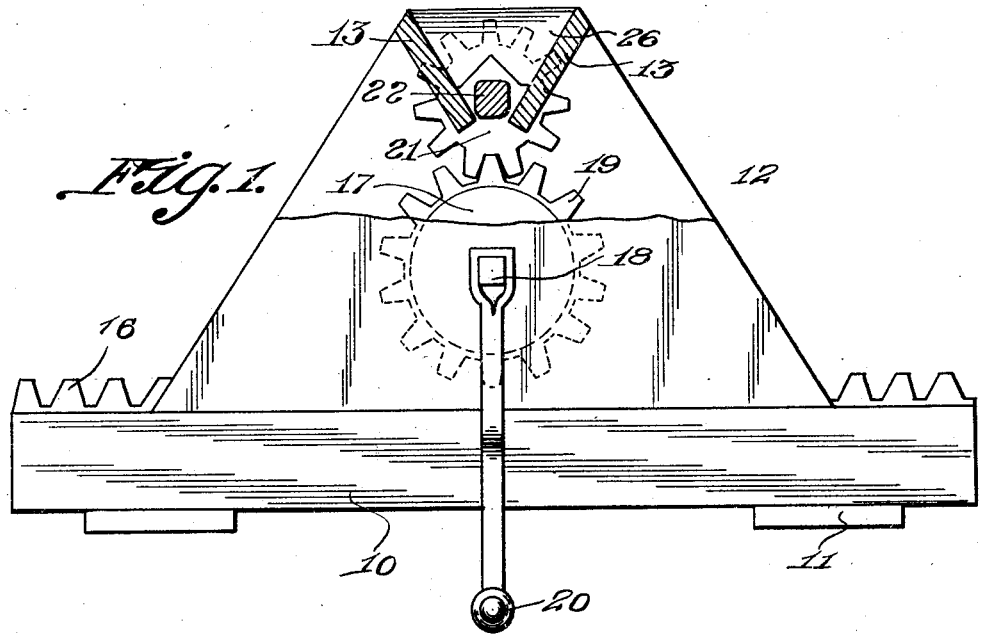
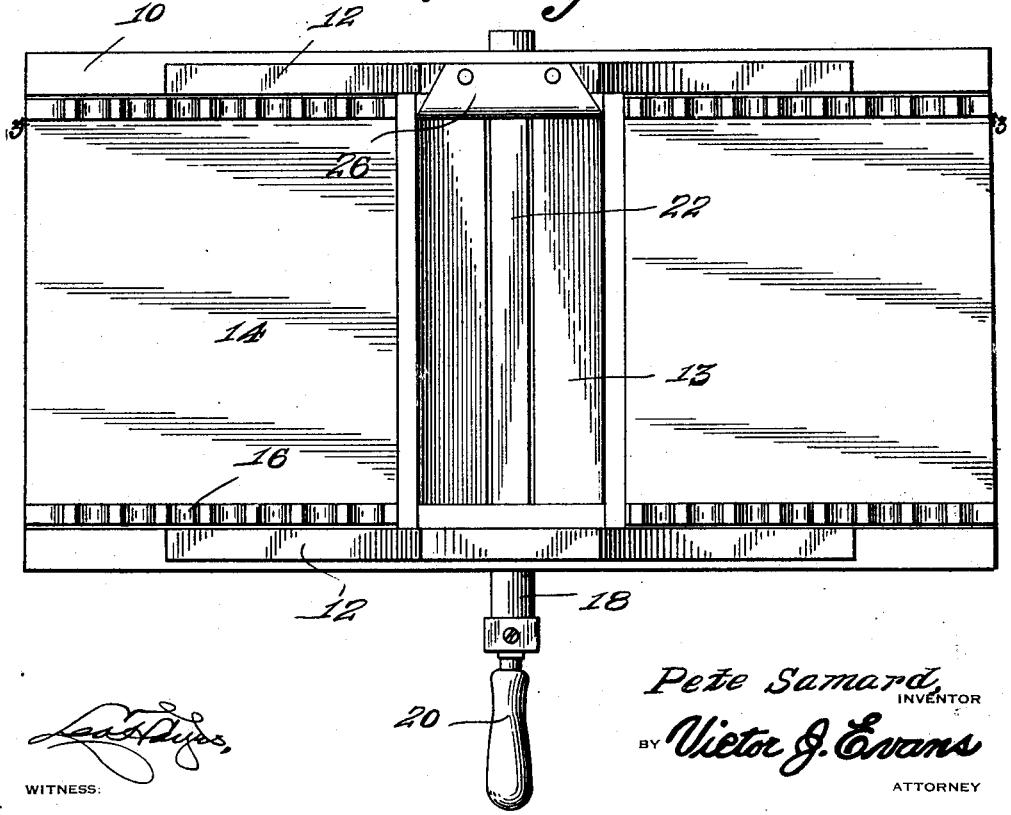
Pete Samard, INVENTOR
BY Victor J. Evans ATTORNEY

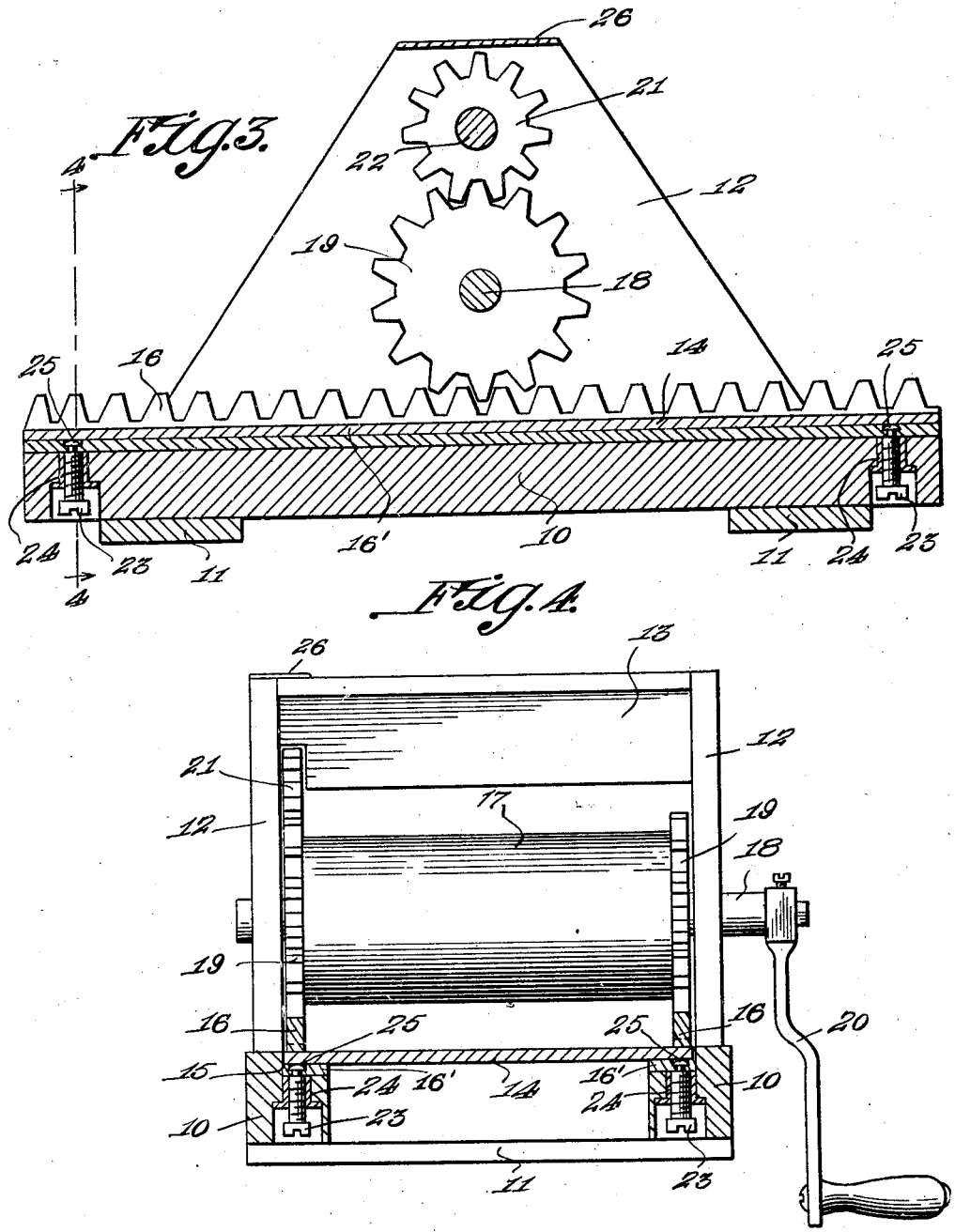

Patented Oct. 15, 1929

1,732,142

UNITED STATES PATENT OFFICE

PETE SAMARD, OF CANBY, OREGON

DOUGH ROLLER

Application filed July 13, 1928. Serial No. 292,559.

This invention relates to improvements in rollers for dough.

An object of the invention comprehends a hopper through which the dough is introduced to the roller.

Another object of the invention contemplates a roller member located immediately beneath the discharge end of the hopper.

A further object of the invention embodies a tray upon which the dough is rolled.

More specifically stated the tray is adjustable with relation to the roller to facilitate rolling of the dough into a desired thickness.

In addition the roller member and tray are operatively connected to feed the dough to the roller when the same are called into use.

Furthermore the hopper is provided with a feeding apparatus operable in conjunction with the roller to facilitate feeding of the dough upon the tray in even sheets to obviate holes in the dough as rolled.

With the above and other objects in view, the invention further consists of the following novel features and details of construction, to be hereinafter more fully described, illustrated in the accompanying drawings and pointed out in the appended claims.

In the drawings:—

Figure 1 is a side elevation of the invention.

Figure 2 is a top plan view thereof.

Figure 3 is a longitudinal sectional view taken on line 3—3 of Figure 2.

Figure 4 is a sectional view taken on line 4—4 of Figure 3.

Referring to the drawings in detail, wherein like characters of reference denote corresponding parts, the reference characters 10 indicate companion supporting members carried upon plates 11. Side pieces 12 of the configuration shown are mounted upon the upper sides of the supporting members 10.

A hopper 13 is disposed and located between the sides 12 adjacent the uppermost ends thereof and preferably centrally thereof; the purpose of such disposition will be presently apparent.

A tray 14, mounted for oscillatory movement within seats 15, upon the supporting members 10, is provided with rack bar portions 16 upon the upper and outer sides thereof. A roller member 17, carried upon the shaft 18, journaled within the sides 12, is provided with gears 19 meshingly engaged with the rack bar portions 16 of the tray 14. An operating handle or lever 20 is fixed to one end of the shaft 18 to impart rotation to the roller member 17 and longitudinal sliding movement to the tray 14. A gear member 21, meshingly engaged with one of the gears 19, carried by the roller member 17, is adapted to actuate a feed member for a roller 22 located within the discharge end of the hopper 13. The feed member 22 is adapted for simultaneous operation in conjunction with the roller member 17 and due to the size of the gear 21, as shown, will travel much faster than the roller member per se to discharge the dough within the hopper 13 at such a speed that the dough discharged upon the roller and rolled against and upon the tray 14 will be free from holes.

As mentioned in the foregoing, the tray 14 is adjustable to regulate the thickness of the dough as rolled and in carrying out the invention I provide adjusting elements 23 carried within sleeve members 24 in the supporting members 10 and provided with rounded heads 25 upon the uppermost ends thereof and upon which the underside of the tray 14 is adapted to slide.

As best illustrated in Figure 3 of the drawings, the particular type of gearing arrangement between the roller member 17 and the tray 14 was provided to afford the utmost adjustment therebetween inasmuch as different thicknesses of dough is often required.

As illustrated in the top plan view in Figure 2 of the drawings, a guard 26, carried upon the upper end of one of the sides 12 is extended downwardly within the hopper 13 to prevent engagement with the gear member 21 operating the feeder 22. The tray 14 is preferably started from the ends rather than the middle, inasmuch as it may be desired to roll sheets of dough in different lengths.

The feeder 22 is preferably rectangular in cross section, whereby the corners thereof will grab and discharge the dough from the hopper upon the roller and in advance thereof upon the tray whereby the dough as rolled will be free of holes.

The invention is susceptible of various changes in its form, proportions and minor details of construction, and the right is herein reserved to make such changes as properly fall within the scope of the appended claim.

Having thus described the invention, what is claimed is:—

A dough roller comprising a supporting apparatus having a slidably mounted tray, a roller member journaled upon and between the sides of the supporting apparatus having gears upon the ends thereof, rack teeth carried by the tray being meshingly engaged with said gears, adjusting elements carried by the supporting apparatus to regulate the clearance between the upper surface of the tray and the roller, a hopper included upon the supporting apparatus, a feeder of cross section rectangular shape being mounted for rotation within the discharge end of the hopper, and a gear member carried upon one end of the feeder and meshingly engaged with one of the gears upon the roller member whereby simultaneous operation in the discharge and rolling of the dough will be facilitated to obviate holes in the dough as rolled.

In testimony whereof I affix my signature.

PETE SAMARD.